United States Patent Office 3,128,203
Patented Apr. 7, 1964

3,128,203

PROTECTIVE POLYINDENE AND TERPENEPHENOL COATINGS FOR SEMICONDUCTORS AND METHOD

Reinhard Dahlberg, Freiburg im Breisgau, Germany, assignor to Clevite Corporation, a corporation of Ohio
No Drawing. Filed May 2, 1961, Ser. No. 107,073
Claims priority, application Germany May 10, 1960
8 Claims. (Cl. 117—201)

This invention relates to semiconductor devices and component parts thereof having functional surface layers and to methods of applying such layers.

Surface layers on semiconductor devices and particularly the component wafer of semiconductive material embodied therein are well known and widely used for a variety of purposes. For example, it is common practice to use a protective coating of wax or similar material to protect specific areas of a wafer in order to achieve selective etching of uncoated regions. Such coatings usually are temporary, being removed after they have served the intended function. Other surface layers, of a permanent nature, are used to protect the device from adverse environmental conditions, such as high humidity, in order to stabilize electrical operating characteristics.

The chemical identity and method of application of the surface layers varies as widely as the intended functions and, frequently, are determined by such functions. Thus, in order to reduce surface re-combinations, surface layers are sometimes provided which have a different concentration of impurities from the semiconductor wafer itself. Surface coatings frequently consist of a layer of the oxide of the semiconductor material formed in situ. In some instances coatings containing oxidizing agents are applied to the wafer surface or they are coated with organopolysiloxanes. Saturated hydrocarbons also are widely used for coatings, wax already having been mentioned as a prime example.

All known surface layers are subject to either one of two important disadvantages: (1) they either fail to provide adequate protection against the external influences sought to be excluded, such as moisture, etchant or other chemical environment, or (2) it is extremely difficult to apply the surface layer with satisfactory cohesion without damage to the semiconductor material, as by excessive heating.

The fundamental object of the present invention is to overcome or mitigate at least one of the disadvantages of the prior art as outlined hereinabove.

A more specific object is the provision of semiconductor devices having surface coatings which are easily applied yet are highly coherent and impervious to moisture, etchants or other ambient influences.

A further object is the provision of methods for the simple and convenient application of highly cohesive surface layers to semiconductor materials without damage or other detrimental effect to the underlying material.

These and other objects of the invention are fulfilled by the present invention wherein it contemplates surface coatings consisting essentially of high melting point unsaturated cyclic hydrocarbons.

Additional objects of the invention, its advantages, scope and the manner in which it may be practiced will be more fully understood by persons conversant with the art from the following description of exemplary embodiments thereof taken in conjunction with the subjoined claims.

The present invention is based on the utilization of atomic bonding to promote cohesion between the surface layer and a substrate of semiconductor material. It is well-known that the common semiconductor materials such as germanium, silicon, and the "III–V" compounds (i.e., compounds of elements from groups III and V of the periodic table) form co-valent crystals. Within the bulk of the crystal the individual valence bonds of each atom are entirely utilized in linking to neighboring atoms which surround it on all sides. Atoms adjacent the surface of the crystal, however, do not utilize all their valence bonds and, as a result, free valence bonds are present.

Materials used heretofore in the formation of surface layers on semiconductor materials have not exploited the availability of free bonds. Thus, for example, the various waxes most often used to mask areas of semiconductors in preparation for selective etching, consist of saturated hydrocarbons which, lacking free bonds of their own, are not in a position to make use of the available binding forces at the surface of the semiconductor material.

Consequently, the surface coating of wax, or other materials having saturated valence bonds, adhere to the semiconductor surface by means of simple mechanical cohesion only. This makes it possible for an etchant to penetrate between the wax layer and semiconductor, at least around the periphery of the masked area, causing a ragged or diffused delineation between etched and unetched surfaces.

The present invention contemplates surface layers consisting of unsaturated hydrocarbons which have a high melting point and form thick coherent layers. In addition to having relatively high melting points the hydrocarbon selected must be susceptible of application with relative ease, such as by vacuum evaporation.

The requisite properties are particularly in evidence in certain cyclic hydrocarbons such as the polyindene and terpene-phenol resins.

Vacuum evaporation has been mentioned as one technique suitable for the application of the surface layer of unsaturated hydrocarbons. Another is by dipping the semiconductor element or material to be coated into a solution of the selected hydrocarbon in a suitable solvent vehicle. The vacuum evaporation procedure lends itself to convenient use of suitable masks to achieve selected deposition of the surface layer.

Using the particular resins mentioned as examples, a surface layer having a thickness of not more than five microns deposited by vacuum evaporation provided satisfactory protection against the etching mediums customarily employed in semiconductor fabrication. With such layers etching depths of 100 to 200 microns were attainable without penetration of etchant between the surface layer and substrate. This would not be possible with a surface layer of paraffin or other known coating agents. It will be appreciated from the foregoing that the invention is well suited to the formation of good mesa structures for transistors.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is desired to be secured by United States Letters Patent is:

1. In combination, a semiconductor device comprising a body of a semiconductive material having free valence bonds available on its surface, and a thin coherent chemically bonded surface layer on said body consisting essentially of an unsaturated cyclic hydrocarbon selected from the group consisting of polyindene and terpene-phenol resins.

2. The combination defined in claim 1 wherein said surface layer is no more than five microns in thickness.

3. In combination with a semiconductor device, a body of semiconductive material having free valence bonds available on its surface and having a thin coherent chemically bonded surface layer of polyindene resin.

4. In combination with a semiconductor device, a body of semiconductive material having free valence bonds available on its surface and having a thin coherent chemically bonded surface layer of terpene-phenol resin.

5. A method of applying a functional surface layer to a body of semiconductive material having free valence bonds available on its surface including the step of contacting at least a portion of the surface of said body with a fluid medium comprising a high melting point, unsaturated cyclic hydrocarbon selected from the group consisting of polyindene and terpene-phenol resins to chemically bond said hydrocarbon to the surface of said body.

6. The method according to claim 5 wherein said fluid medium is a solution of said hydrocarbon in a solvent vehicle.

7. The method according to claim 5 wherein said fluid medium is the vapor phase of said hydrocarbon.

8. A method of applying a functional surface layer to a body of semiconductive material having free valence bonds on its surface including vapor deposition on at least a portion of the surface of said body of a high melting point unsaturated cyclic hydrocarbon selected from the group consisting of polyindene and terpene-phenol resins to effect chemical bonding of said hydrocarbon to the surface of said body.

References Cited in the file of this patent

UNITED STATES PATENTS

| | | |
|---|---|---|
| 2,373,714 | Soday | Apr. 17, 1945 |
| 2,596,235 | Geiger | May 13, 1952 |
| 2,893,900 | Machlin | July 7, 1959 |
| 2,913,358 | Harrington et al. | Nov. 17, 1959 |
| 2,937,110 | John | May 17, 1960 |
| 2,986,486 | Short | May 30, 1961 |